US009896265B2

(12) United States Patent
Sundholm (10) Patent No.: US 9,896,265 B2
(45) Date of Patent: Feb. 20, 2018

(54) METHOD AND APPARATUS IN PNEUMATIC MATERIALS HANDLING AND A WASTE CONTAINER/SEPARATING DEVICE

(71) Applicant: MARICAP OY, Vantaa (FI)

(72) Inventor: Göran Sundholm, Tuusula (FI)

(73) Assignee: MARICAP OY, Vantaa (FI)

( * ) Notice: Subject to any disclaimer, the term of this patent is extended or adjusted under 35 U.S.C. 154(b) by 0 days.

(21) Appl. No.: 14/767,420

(22) PCT Filed: Feb. 19, 2014

(86) PCT No.: PCT/FI2014/050121
§ 371 (c)(1),
(2) Date: Aug. 12, 2015

(87) PCT Pub. No.: WO2014/135746
PCT Pub. Date: Sep. 12, 2014

(65) Prior Publication Data
US 2015/0375935 A1   Dec. 31, 2015

(30) Foreign Application Priority Data

Mar. 5, 2013   (FI) ..................................... 20135209
Mar. 5, 2013   (FI) ..................................... 20135210

(51) Int. Cl.
*B65G 53/24*       (2006.01)
*B65F 1/10*        (2006.01)
(Continued)

(52) U.S. Cl.
CPC .............. *B65F 1/105* (2013.01); *B65F 5/005* (2013.01); *B65G 53/24* (2013.01); *B65G 53/36* (2013.01)

(58) Field of Classification Search
CPC ....... B65G 53/24; B65G 53/526; B65F 1/105; B65F 5/005
(Continued)

(56) References Cited

U.S. PATENT DOCUMENTS 3,583,770 A * 6/1971 Medhammar .......... B65G 53/64
                                                                100/215
3,799,622 A * 3/1974 Hek ........................ B65G 53/24
                                                                406/109
(Continued)

FOREIGN PATENT DOCUMENTS

CN       101903262 A     12/2010
CN       101903263 A     12/2010
(Continued)

OTHER PUBLICATIONS

International Search Report, issued in PCT/FI2014/050121, dated Jun. 19, 2014.
(Continued)

*Primary Examiner* — Joseph A Dillon, Jr.
(74) *Attorney, Agent, or Firm* — Birch, Stewart, Kolasch & Birch, LLP (57) ABSTRACT

Method for filling a waste container/separating device (50) of a pneumatic material conveying system, in which method material is conducted into a material container from a conveying pipe (100) via an inlet aperture (55) and in which method, for bringing about the suction/partial vacuum needed in conveying the material, the suction side of a partial-vacuum source (30) is connected to act in the container space of the waste container/separating device (50) and onwards into the conveying pipe (100). By changing the point at which the suction of the partial-vacuum source acts or the strength of its action in the container space (68) of the waste container/separating device (50), the input direction in the container space of the material (W) being conducted into
(Continued)

the container space from the inlet aperture (55) is acted upon. The invention also relates to an apparatus and to a waste container/separating device.

6 Claims, 5 Drawing Sheets

(51) Int. Cl.
*B65F 5/00* (2006.01)
*B65G 53/36* (2006.01)

(58) Field of Classification Search
USPC .................. 406/151, 152, 153, 168, 197
See application file for complete search history.

(56) References Cited

U.S. PATENT DOCUMENTS

| | | | | | |
|---|---|---|---|---|---|
| 3,826,366 | A * | 7/1974 | Naumburg | ............. | B65F 5/005 209/135 |
| 3,838,634 | A * | 10/1974 | Alexandrov | ............. | B30B 9/30 100/190 |
| 3,951,461 | A * | 4/1976 | De Feudis | ............. | B65F 5/005 406/10 |
| 3,956,776 | A * | 5/1976 | Vanden Broek | ........ | E03F 1/006 137/236.1 |
| 3,981,454 | A * | 9/1976 | Williams | ............... | B02C 21/00 241/19 |
| 4,016,994 | A | 4/1977 | Wurster | | |
| 4,077,847 | A * | 3/1978 | Choi | ............. | B03B 9/06 201/12 |
| 4,113,185 | A * | 9/1978 | Marsh | ............. | B03B 9/06 209/18 |
| 4,169,418 | A * | 10/1979 | Cottrell | ............. | B01D 50/00 110/216 |
| 4,341,492 | A * | 7/1982 | Montgomery, Jr. | ... | B65G 53/24 119/442 |
| 4,561,132 | A * | 12/1985 | Lew | ............. | A47K 11/02 4/321 |
| 4,791,949 | A * | 12/1988 | Tank | ............. | E03F 1/006 137/1 |
| 5,083,704 | A * | 1/1992 | Rounthwaite | ........ | B65F 1/0093 15/314 |
| 5,114,280 | A * | 5/1992 | Ushitora | ............. | E03F 1/006 137/236.1 |
| 5,575,304 | A * | 11/1996 | Hassett | ............. | E03F 1/006 137/1 |
| 5,644,802 | A * | 7/1997 | Olin | ............. | E03F 1/006 4/431 |
| 7,080,960 | B2 * | 7/2006 | Burnett | ............. | B65G 43/08 406/11 |
| 8,006,471 | B2 * | 8/2011 | Owen | ............. | A01D 46/10 56/31 |
| 9,434,541 | B2 * | 9/2016 | Ratnam | ............. | B65F 1/0093 |
| 2003/0009068 | A1 * | 1/2003 | Platz | ............. | C10G 1/10 585/241 |
| 2004/0088957 | A1 * | 5/2004 | Fisher | ............. | B01D 50/002 55/350.1 |
| 2004/0141891 | A1 * | 7/2004 | Abe | ............. | F23G 5/027 422/600 |
| 2005/0074302 | A1 * | 4/2005 | Burnett | ............. | B65G 43/08 406/56 |
| 2007/0234906 | A1 * | 10/2007 | DeMarco | ............. | B01D 45/12 96/382 |
| 2010/0183380 | A1 * | 7/2010 | Dietterich | ............. | B65G 23/00 406/171 |
| 2010/0196129 | A1 * | 8/2010 | Buckner | ............. | E02F 3/94 414/467 |
| 2010/0276271 | A1 * | 11/2010 | Dinnematin | ............. | C10B 7/06 201/25 |
| 2011/0061738 | A1 * | 3/2011 | Strimling | ............. | B65G 53/24 137/1 |
| 2012/0233758 | A1 * | 9/2012 | Tolles | ............. | E03F 1/006 4/321 |
| 2013/0004249 | A1 | 1/2013 | Sundholm | | |
| 2013/0220893 | A1 * | 8/2013 | Sukkar | ............. | B03B 9/06 209/147 |
| 2014/0010603 | A1 * | 1/2014 | Blais | ............. | B60P 1/60 406/39 |
| 2014/0284197 | A1 * | 9/2014 | Chalabi | ............. | C10B 49/08 201/1 |
| 2014/0306037 | A1 * | 10/2014 | Shideler, Jr. | ............. | B02C 23/14 241/19 |
| 2015/0191308 | A1 * | 7/2015 | Sundholm | ............. | B65F 1/105 414/404 |
| 2015/0232271 | A1 * | 8/2015 | Sundholm | ............. | B65F 3/143 100/90 |
| 2015/0246773 | A1 * | 9/2015 | Sundholm | ............. | B65F 1/0093 406/1 |
| 2015/0274418 | A1 * | 10/2015 | Sundholm | ............. | B65F 1/105 414/293 |
| 2015/0274419 | A1 * | 10/2015 | Sundholm | ............. | B65F 1/105 414/293 |
| 2015/0321843 | A1 * | 11/2015 | Forestier | ............. | B65G 53/66 406/30 |
| 2015/0329287 | A1 * | 11/2015 | Ratnam | ............. | B65F 1/0093 414/572 |
| 2016/0075583 | A1 * | 3/2016 | McCabe | ............. | B01D 19/0036 210/748.02 |

FOREIGN PATENT DOCUMENTS

| | | |
|---|---|---|
| DE | 3124766 A1 | 4/1983 |
| DE | 19635549 A1 | 3/1998 |
| DE | 10344542 A1 | 5/2005 |
| GB | 1262023 A | 2/1972 |
| JP | 08-244906 A | 9/1996 |
| JP | 3013281 B2 | 2/2000 |
| JP | 2005-239371 A | 9/2005 |
| SE | 419431 B | 8/1981 |
| SE | 454506 B | 5/1988 |
| SU | 664896 A1 | 5/1979 |
| WO | WO 2005/084509 A1 | 9/2005 |
| WO | WO 2008/016290 A1 | 2/2008 |
| WO | WO 2011/110740 A2 | 9/2011 |
| WO | WO 2014/037611 A1 | 3/2014 |

OTHER PUBLICATIONS

Written Opinion of the International Searching Authority, issued in PCT/FI2014/050121, dated Jun. 19, 2014.
Office Action issued in corresponding CN Application No. 201480011678.8 dated Jun. 3, 2016 (with English translation).
Supplementary Search Report issued in corresponding EP Application No. 14 75 9455.0 dated Sep. 2, 2016 (in English).

* cited by examiner

FIG. 11

METHOD AND APPARATUS IN PNEUMATIC MATERIALS HANDLING AND A WASTE CONTAINER/SEPARATING DEVICE

FIELD OF THE INVENTION

The object of the invention is a method for filling a waste container/separating device of a pneumatic material conveying system.

The object of the invention is an apparatus for filling a waste container/separating device of a pneumatic material conveying system, in which a material container is an inlet aperture, to which the material conveying pipe of the conveying system can be connected for conducting the material from the conveying pipe into the container part of the waste container/separating device, and a member is provided for connecting the suction side of a partial-vacuum source, for bringing about the suction/partial vacuum needed in conveying the material, to the container space of the waste container/separating device and onwards into the conveying pipe.

The object of the invention is a waste container/separating device for pneumatic pipe transporting systems for material.

The invention relates generally to material conveying systems, such as to partial-vacuum transporting systems, more particularly to the collection and conveying of wastes, such as to the conveying of household wastes.

BACKGROUND OF THE INVENTION

Systems wherein wastes are conveyed in piping by means of a pressure difference or suction are known in the art. In these, wastes are conveyed long distances in the piping by sucking. It is typical to these systems that a partial-vacuum apparatus is used to achieve a pressure difference, in which apparatus negative pressure is brought about in the conveying pipe with partial-vacuum generators, such as with vacuum pumps or with an ejector apparatus. A conveying pipe typically comprises at least one valve means, by opening and closing which the replacement air coming into the conveying pipe is regulated. Inlet points, such as refuse chutes, are used in the systems at the material input end, into which inlet points material, such as waste material, is fed and from which the material to be conveyed is conveyed into a conveying pipe by opening a discharge valve means. The conveying of wastes occurs mainly by the aid of a pressure difference produced by an air flow. The air flow is generally brought about by sucking air through the piping. Also known in the art are solutions wherein a pressure difference for conveying wastes is achieved with a blowing system. Waste material, such as e.g. waste material packed into bags, is conveyed from an inlet point into a conveying pipe and onwards into a separating device, where the wastes are separated from the transporting air. In connection with the separating device can be a transfer means, such as a transfer means arranged into a cylinder-piston combination, with which transfer means the wastes are displaced from the separating device into a waste container, e.g. into a freight container. These types of solutions comprising a separate separating device, e.g. a cyclone separator, and a waste container separate to it, are well suited to extensive systems in which the space requirements of the waste station do not set limitations. Also known in the art are solutions wherein waste material is conducted in a conveying pipe directly into a waste container, which simultaneously functions as a separating device. These are mainly intended for rather small systems. This type of waste container/separating device is often arranged to be a kind of freight container. In the art they are called horizontal separator containers. A problem in prior-art combinations of a waste container and separating device, more particularly in horizontal separator containers, is that in them a part of the material, or certain types of materials, remain in the container space loosely packed and thus take up space.

In addition, the wastes intended for transporting can be different in their properties, e.g. very different types of waste allotments to be transported can be arranged in waste bags. These have different properties, e.g. mass, which essentially affect inter alia the speed at which a waste bag displaces in the conveying piping and from the piping into the waste container/separating device. The conveying speed of the waste material in the piping is typically dimensioned according to the heaviest in mass. Also the conveying distance in the piping affects the speed needed. In this case the speed of light waste material from the piping into the waste container/separating device is high, in which case the waste material collides into the container space of the waste container/separating device at a speed that causes the waste bag used in transporting the waste material to break. This is detrimental particularly in application sites in which different waste allotments are left to be transported from an inlet point along conveying piping into a waste container/separating device and the final sorting of the transported waste bags occurs e.g. only at the waste station to which the waste container/separating device is transported. At the waste station the sorting of waste can be performed e.g. with a color identification and/or with an RFID identification arranged in connection with the waste bags and/or in some other suitable manner. It is obvious that the breakage of waste bags hampers sorting and also causes hygiene problems.

The aim of the present invention is to achieve an entirely new type of solution in connection with a pneumatic wastes conveying system. Another aim of the invention is to achieve a solution, by means of which the problems of prior art are avoided. One aim of the invention is to achieve a solution by the aid of which the container space of a waste container/separating device can be efficiently filled with material. The aim of the invention is also to achieve an apparatus, by the aid of which breakages of the material being transported or breakages of the transport container, such as a bag or sack, of the material being transported can be reduced when feeding the material into a waste container/separating device.

BRIEF DESCRIPTION OF THE INVENTION

The method according to the invention is directed to:

supplying waste to the waste container/separating device from a conveying pipe via an inlet aperture, said waste container/separating device includes a container space;

providing a partial-vacuum source including a suction side;

supplying a suction/partial vacuum needed for conveying the waste, the suction side of the partial-vacuum source being connected to act in the container space of the waste container/separating device and into the conveying pipe;

changing at least one of a point at which the suction of the partial-vacuum source acts or a strength of the suction/partial vacuum in the container space of the waste container/separating device; and changing the input direction of the waste into the container space of the waste being supplied into the container space from the inlet aperture by changing at least one of the point at which the suction of the partial-vacuum source acts or the strength of the suction/partial vacuum.

The apparatus according to the invention includes a device for changing the point at which the suction of the partial-vacuum source acts or for changing the strength of its action in the container space of the waste container/separating device in such a way that the input direction in the container space of the material being conducted into the container space from the inlet aperture is acted upon.

The waste container/separating device according to the invention includes at least one inlet aperture for connecting it to a material conveying pipe and means for connecting the suction side of a partial-vacuum generator to the container and/or for conducting transporting air out of the container space, wherein a first suction channel and a second suction channel are arranged in the container space of the waste container/separating device, in each of which suction channels is at least one suction aperture and a member is provided for connecting the suction side to the suction channels.

The solution according to the invention has a number of significant advantages. With the solution according to the invention, it is possible efficiently fill the container space of the waste container/separating devices of pneumatic pipe transport systems for material. This, inter alia, enhances the efficiency of the processes for transporting and storing wastes. The solution according to the invention enables simpler waste container/separating devices than before, in connection with which a separate press device is not needed. The solution according to the invention enables the breakage of waste bags to be avoided better than before when they are fed into the waste container/separating device with a pneumatic pipe transport system for wastes. This has significant advantages, particularly if the sorting of wastes is performed only at the waste station. The solution according to the invention is applicable in connection with very different containers. By using an impact-damping element according to the invention in a waste container/separating device, material can be displaced farther in the piping because the impact-damping element effectively prevents breakage of lighter material allotments, or of the bags or sacks being used in conveying them. By using an impact-damping element to be suspended on the waste container, not only effective impact damping but also a simple structure is achieved. The solution according to the invention also enables efficient emptying of the container, because the impact-damping element moves out of the way of the material to be emptied. According to the invention effective impact damping is achieved with an impact-damping partition arranged on the rear part of the waste container/separating device, on the bottom end of which partition a weight is placed. The solution according to the invention is suited for use in connection with many different types of pneumatic pipe transport systems for material. Also, inter alia, systems using blowing for the conveying of material are feasible, in addition to partial-vacuum systems.

BRIEF DESCRIPTION OF THE FIGURES

In the following, the invention will be described in more detail by the aid of an embodiment with reference to the attached drawings, wherein.

DETAILED DESCRIPTION OF THE INVENTION

Figure 1:
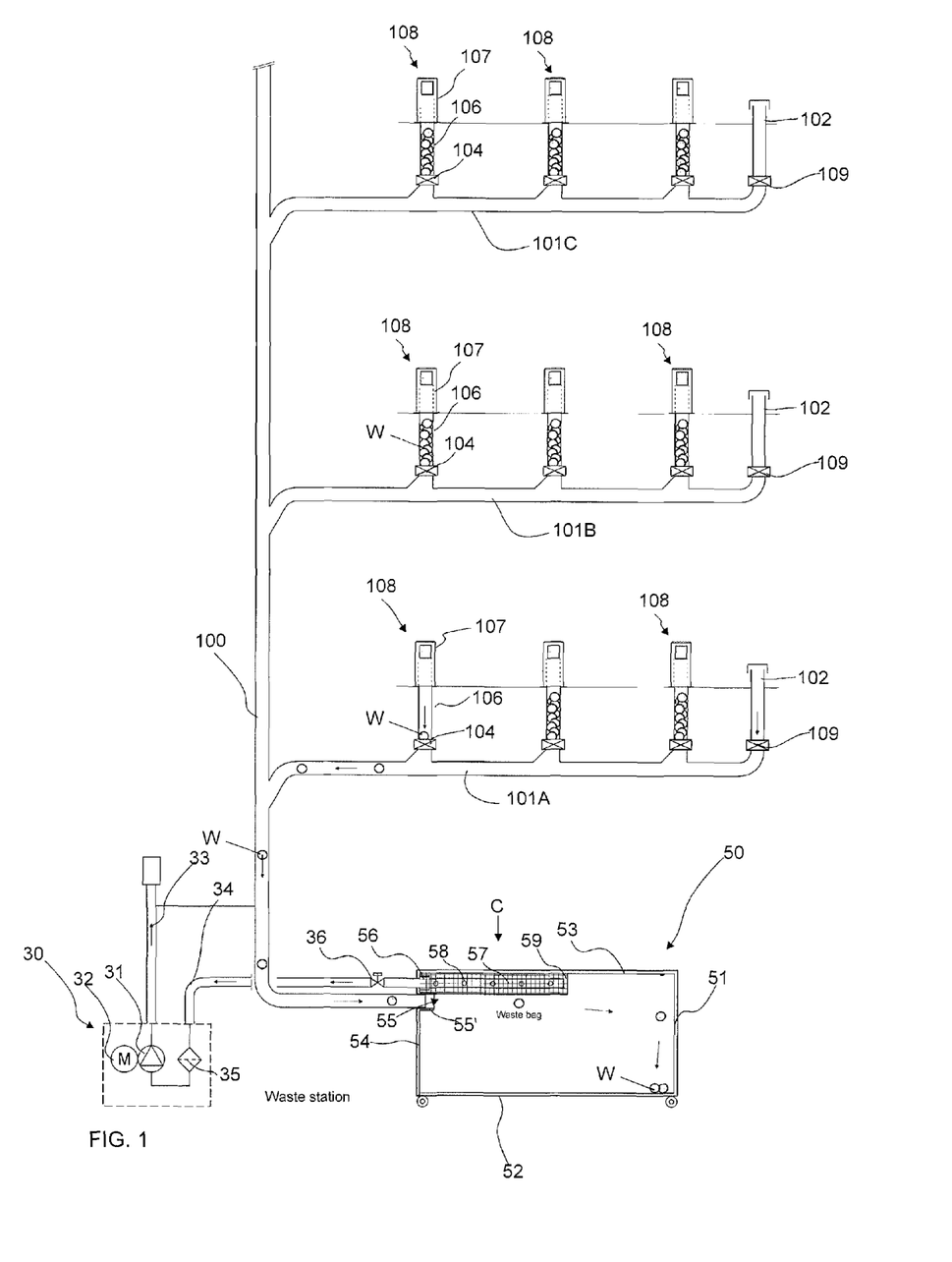
FIG. 1 presents a simplified and partially cross-sectioned view of an embodiment of the invention in connection with a pneumatic conveying system for wastes.

FIG. 1 presents a diagram of part of a pneumatic material conveying system, which part comprises a material conveying pipe 100, along the side of which at least one, typically many, inlet points 108 are arranged. An inlet point 108 is a feed-in station of material, more particularly of waste material, intended to be transported, from which station the material W, more particularly waste material, such as household waste or recyclable material packed into bags or sacks, intended to be transported is fed into the conveying system. An inlet point 108 can also be a refuse chute, into which material is fed from inlet apertures on different floors of a building. The system can comprise a number of feed-in stations 108, from which the material intended to be transported is fed into conveying piping 100, 101A, 101B, 101C. By opening and closing a shut-off means, such as a valve means 104, that is possibly in connection with an inlet point, material can be conveyed from the inlet point 108 into the conveying pipe 100. An inlet point 108 is connected on the valve side to the conveying pipe 100 or to an inlet pipe in connection with it. Typically conveying piping comprises a main conveying pipe 100, to which it has been possible to connect a number of branch conveying pipes 101A, 101B, 101C, and to which branch conveying pipes it has been possible to connect in turn a number of feed-in stations 108. In the embodiment of FIG. 1 the inlet point 108 is an inlet point 107 of waste material, said inlet point 107 being disposed on the surface of the ground. Between an inlet point 108 and the valve means 104 is a feeder channel 106, which is configured to function as an intermediate container for the material W being conveyed. The conveying piping can be arranged to travel underground. In the embodiment of the figure the conveying piping comprises replacement air ducts 102, in which a replacement air valve 109 is arranged.

A conveying pipe typically comprises at least one valve means, by opening and closing which the replacement air coming into the conveying pipe is regulated. Inlet points 108, such as refuse chutes, are used in the systems at the material input end, into which inlet points material, such as waste material, is fed and from which the material to be conveyed is conveyed into a conveying pipe by opening a discharge valve means 104. The conveying of wastes occurs mainly by the aid of a pressure difference produced by an air flow. The air flow is generally brought about by sucking air through the piping. Waste material W, such as e.g. waste material packed into bags, is conveyed from an inlet point 108 into the conveying pipe 100 and onwards into a separating device, where the wastes are separated from the transporting air.

An essential device in the invention is the waste container/separating device 50, which is according to the invention a combination of a collection container for material, which is formed from a container, and of means arranged in it separating the transporting air and the material being conveyed from each other. According to one embodiment the waste container/separating device 50 is a movable container/separating device, for example a so-called horizontal separator container. The conveying pipe 100 can be connected to the waste container/separating device 50, in which the material being transported is separated from the transporting air. An inlet aperture 55, into which the conveying pipe 100 can be fitted, is formed in the wall of the waste container/separating device 50, which wall is an end wall 54 in the figure. In the figure the end of the conveying pipe 100 is fitted into the inlet aperture 55, inside the wall 55' of it. A joint means can also be formed in the conveying pipe 100 and a counterpart in the wall of the container, in the inlet aperture 55, such as a collar formed from the wall 55'. The joint means and the counterpart can in this case together form joint means, e.g. a snap-on coupling. A connection 56 is formed in the waste container/separating device 50, to which connection a pipe or hose 34 coming from a partial-vacuum generator 31 of a partial-vacuum source can be connected with the counterpart.

In the embodiment of the figure, the partial-vacuum source 30 of the pneumatic waste conveying system comprises a partial-vacuum generator 31, which is driven with a drive device 32. The partial-vacuum generator 31 can be e.g. a vacuum pump or some other means achieving negative pressure. The suction side of the partial-vacuum generator 31 is connected to a waste container/separating device 50 via a medium pathway 34. In this case the suction/pressure difference needed in the conveying of material can be achieved in the waste container/separating device 50, in its container part 68, and via the inlet aperture 55 in the conveying piping 100, 101A, 101B, 101C. Between the partial-vacuum generator 31 and the waste container/separating device 50 is a filtering device 35. On the blowing side of the partial-vacuum generator 31 is an exhaust duct 33. The partial-vacuum source 30, the partial-vacuum generator 31 of it, can be connected from the suction side via the medium pathway 34 to the waste container/separating device 50 with a counterpart arranged in the connection 56. In the medium pathway between the partial-vacuum source and the waste container/separating device 50 is a valve means 36, with which the connection from the partial-vacuum source 30 to the waste container/separating device can be opened and closed. FIGS. 2-6 present an embodiment wherein the medium pathway 34 of the suction side of the partial-vacuum generator branches into a second medium pathway 34' and is led to a connection 56 arranged at another point in the waste container/separating device another point. The second medium pathway 34' comprises a second valve means 36', for opening and closing the connection to the suction side of the partial-vacuum generator.

In the solution according to the figures, the waste container/separating device 50 comprises a base 52, an end wall 51, a top wall 53, side walls 66, 67 and a second end wall 54. The walls 51, 52, 53, 54, 66, 67 bound the container space 68. In the embodiment of the figure, the waste container/separating device 50 has at least one suction channel 57, which extends from the connection 56 into the inside space of the waste container/separating device. In the embodiment of the figure, the suction channel 57 is arranged in the top part of the container space 68 of the waste container/separating device in the orthogonal cross-section (FIG. 5) with respect to the longitudinal direction of the container in the corner area, or in the proximity of same, between the top wall 53 and the side wall 66 and/or 67. In the embodiment of the figures, the waste container has two suction channels 57, 57'. Of these, the first suction channel 57 is arranged in the orthogonal cross-section (FIG. 5) with respect to the longitudinal direction of the container, in the corner area, or in the proximity of same, between the top wall 53 and the side wall 67, and the second suction channel 57' is arranged in the corner area, or in the proximity of same, between the top wall 53 and the second side wall 66. A connection to the suction side of the partial-vacuum generator 31, i.e. suction, can be arranged via either the first suction channel 57 or the second suction channel 57' or via both suction channels 57, 57'. The connection of the first suction channel 57 to the suction side of the partial-vacuum generator 31 can be opened and closed in the figures with a first valve means 36. The connection of the second suction channel 57' to the suction side of the partial-vacuum generator can be opened and closed with a second valve means 36'.

In the embodiment of the figures the inlet aperture 55 from the conveying pipe 100 into the waste container/separating device, into the container space 68 of it, is arranged between the first suction channel 57 and the second suction channel 57'.

Figure 2:
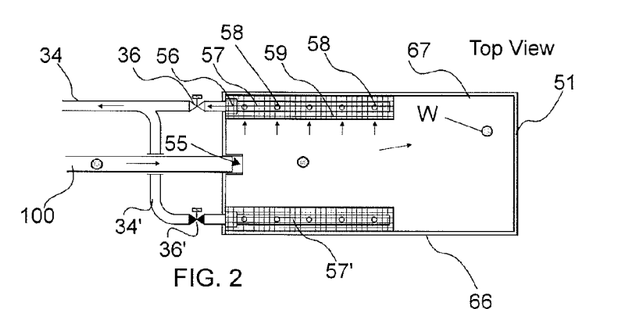
FIG. 2 presents an embodiment of a waste container/separating device according to the invention, from the direction C of FIG. 1 with the top wall removed, in a first operating mode.

At least one suction aperture 58 is arranged in the suction channel 57, 57' for the length of it. In the embodiment of the figure there are a number of suction apertures 58 for the length of the suction channel 57, 57' and possibly also arranged on the rim of the wall of the suction channel 57, 57'. A wall part 59, such as dense netting, that allows air to pass through is also arranged in the container space 68, which wall part allows air through but prevents the passage of at least large-sized material particles into the suction channel 57, 57' from the suction apertures 58. The wall part 59 that allows air to pass through and the top wall 53 of the container and one of the two side walls 66 or 67 form the longitudinal chamber space of the container, into which chamber space the suction channel 57, 57' is arranged. When the suction side of the partial-vacuum generator 31 is connected to act via the first medium channel 34 and the connection 56 in the first suction channel 57, the suction acts via the suction apertures 58 of the first suction channel, and through the wall 59 that allows air to pass, into the container space 68 of the waste container/separating device and onwards via the inlet aperture 55 into the conveying piping 100, 101A, 101B, 101C. The material to be fed into the container space 68 from the inlet aperture 55 is guided in the container space 68 to the side where the suction is acting. In FIG. 2 the suction acts in the container space via the suction apertures 58 of the first suction channel 57. In this case the first valve 36 is open. The second valve 36' closes the medium connection from the suction side of the partial-vacuum generator to the second suction channel 57'. According to FIG. 2 the material units W being conducted into the container space, such as bags containing waste material, are guided in the container space from the conveying pipe from the direction of the inlet aperture 55 essentially to the first suction channel 57 side of the container space. According to one embodiment the container space starts to fill from the opposite end of the container space 68 with respect to the inlet aperture 55.

Figure 3:
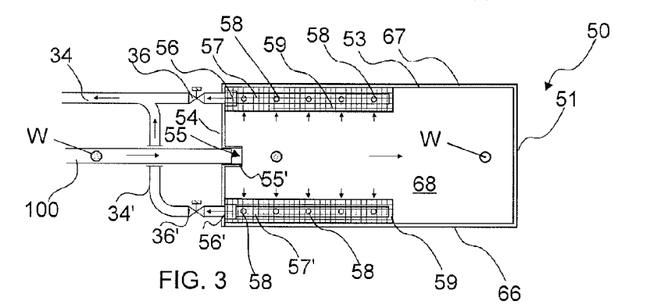
FIG. 3 presents an embodiment of a waste container/separating device according to the invention, from the direction C of FIG. 1 with the top wall removed, in a second operating mode.

FIG. 3 presents an operating mode, in which the suction acts in the container space 68 via the suction apertures 58 of the first suction channel 57 and of the second suction channel and onwards via the inlet aperture into the conveying pipe 100. In this case the material being fed in from the inlet aperture 55 is guided to roughly the center in the container space when the effects of suction via the first and second suction channel essentially correspond to each other.

Figure 4:
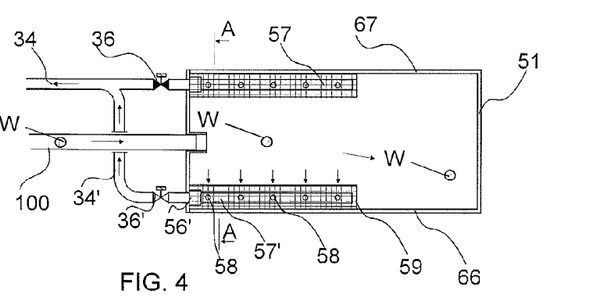
FIG. 4 presents an embodiment of a waste container/separating device according to the invention, from the direction C of FIG. 1 with the top wall removed, in a third operating mode.
Figure 5:
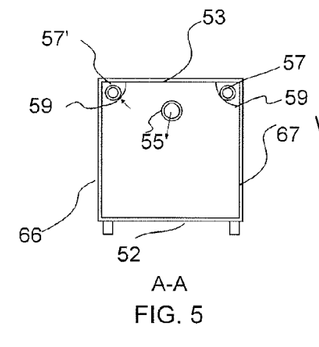
FIG. 5 presents an embodiment of a waste container/separating device according to the invention, cross-sectioned along the line A-A of FIG. 4.

FIG. 4 presents a situation in which the first valve means is closed and the second valve means 36' is open, i.e. the medium connection from the suction side of the partial-vacuum generator into the container space 68 is open via the suction apertures 58 of the second suction channel 57'. The material units W being conducted into the container, such as bags containing waste material, are guided in the container space from the conveying pipe from the direction of the inlet aperture 55 essentially to the second suction channel 57' side of the container space.

Material w, such as household waste or recyclable material packed into bags or sacks, is fed in from an inlet point 108 into the piping 101A, 101B, 101C, 100, where it is conveyed by the aid of suction/a pressure difference and/or transporting air flowing in the piping into the waste container/separating device 50 from the inlet aperture 55.

The material is separated from the transporting air, e.g. by the aid of collision and gravity, in such a way that heavier material W travels to the bottom part of the container. A suction channel 57 is arranged in the top part of the waste container/separating device 50, which suction channel is connected to the suction side of the partial-vacuum generator 31. The transporting air leaves the container part 68 of the waste container/separating device into the suction channel 57. The wall 59 allowing air to pass through prevents the passage of at least the larger material particles into the suction channel. The smaller particles are filtered in the filtering device 35 (FIG. 1).

When the material collects from the inlet aperture 55 of the waste container/separating device 50 along with the transporting air, at least a part of the material w collides at first with the rear wall 51 of the container and drops downwards in the container space 68. This occurs in situations according to FIGS. 2-4 in the initial stage of the filling of the container space 68 of the waste container/separating device. After the filling has progressed, the material W collides with the material that has already collected in the container earlier.

Figure 6:
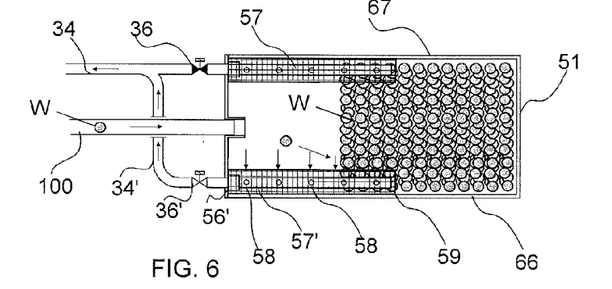
FIG. 6 presents an embodiment of a waste container/separating device according to the invention, from the direction C of FIG. 1 with the top wall removed, in one operating mode.

FIG. 6 presents an operating mode in which a significant amount of material W has already collected in the container. When the waste container/separating device 50 starts to fill, the suction effect increases in those areas that do not yet have any material W. According to FIG. 6, the lateral suction effect increases and at the same time material displaces at a sharper angle to the suction side.

Figure 7:
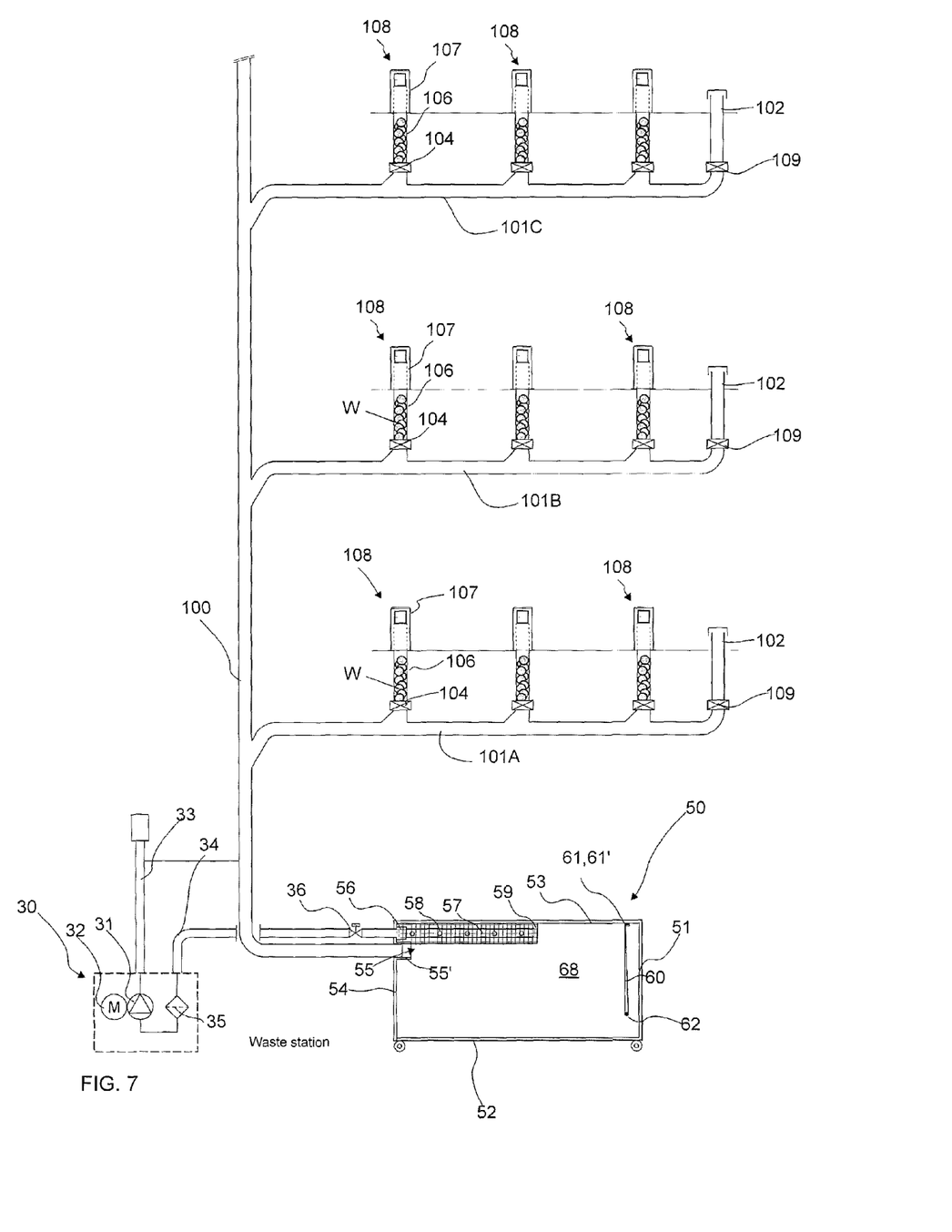
FIG. 7 presents a simplified and partially cross-sectioned view of an embodiment of the invention in connection with a pneumatic conveying system for wastes.

One apparatus and waste container/separating device 50 according to an embodiment of the invention is presented in more detail in FIGS. 7-11. In the solution according to the figures, the waste container/separating device 50 comprises a base 52, an end wall 51, a top wall 53, side walls 66, 67 and a second end wall 54. The walls 51, 52, 53, 54, 66, 67 bound the container space 68. At least one impact-damping element 60 is arranged in the container space 68. The impact-damping element 60 is configured to reduce the force effect (impact) exerted on the material W arriving in the container space along the conveying pipe 100 into the container space 68 from the inlet aperture 55 when the material W collides into the structures of the container or into the material that is in the container. In the embodiment of the figure the impact-damping element 60 extends from the top part of the container a distance towards the bottom part of the container when the impact-damping element 60 is in a vertical position. In the embodiment of FIGS. 7-11, the impact-damping element 60 is arranged at its top part 61 on the upper wall 53 of the container with fixing means 61'. In the embodiment of FIGS. 7-11, the impact-damping element 60 is arranged to a part of the height of the container space 68, in which case a free space is between the bottom part 62 of the impact-damping element 60 and the base 52 of the container. The impact-damping element 60 is arranged at the point of the inlet aperture 55 in the height direction of the container, and at a distance from it in the longitudinal direction of the container. In the embodiment of the figure, a gap remains between the side edges of the impact-damping element 60 and the side walls 66, 67 of the waste container/separating device. According to one preferred embodiment the impact-damping element is a bendable mat. In FIG. 7 the impact-damping element 60 is mainly planar when hanging free, but it can also be another shape, e.g. concave, convex or wavy. According to one embodiment on the bottom part 62 of the impact-damping element is a weight, or it is of a heavier material at its bottom edge. This keeps the impact-damping element straight when it is in the rest position. The impact-damping element 60 can be e.g. rubber material, plastic material, textile, or wire mesh, or combinations of these. Other suitable materials can be considered, depending on the application site.

The impact-damping element 60 in the container space 68 turns or bends when emptying the container of material from the front, in which case emptying can be performed quickly and efficiently. Friction-reducing means, e.g. roller means according to the figure, which facilitate the moving of the waste container/separating device, can be arranged on the bottom part of the waste container/separating device 50.

Figure 8:
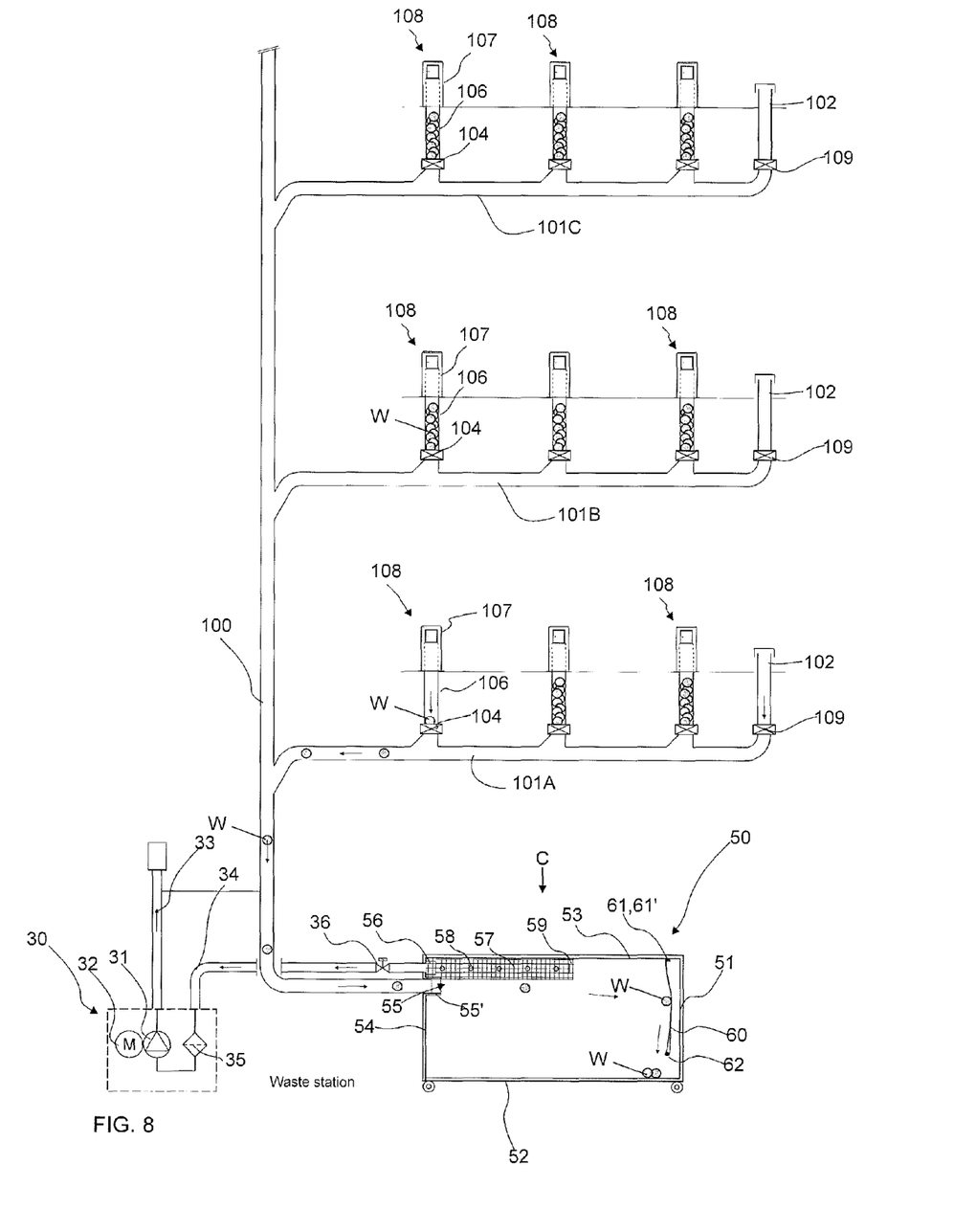
FIG. 8 presents an embodiment of the invention in one operating mode.
Figure 9:
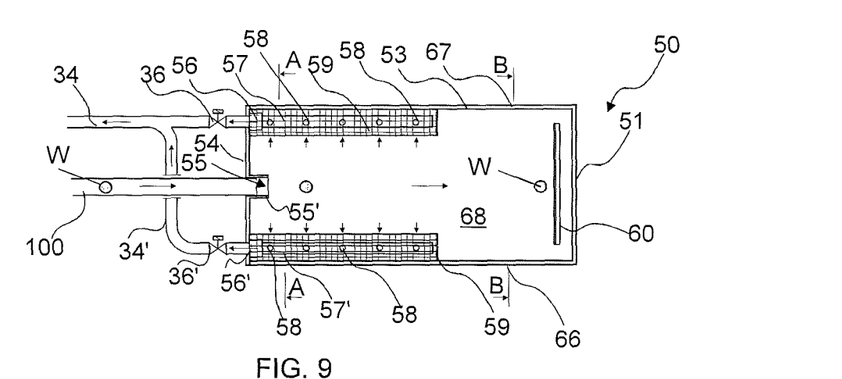
FIG. 9 presents an embodiment of the waste container/separating device according to the invention, from the direction C of FIG. 8 with the top wall removed.
Figure 10:
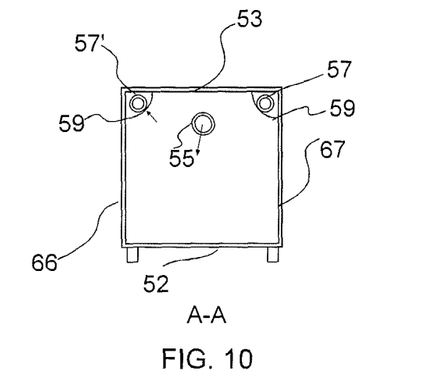
FIG. 10 presents an embodiment of the waste container/separating device according to the invention, cross-sectioned along the line A-A of FIG. 9.
Figure 11:
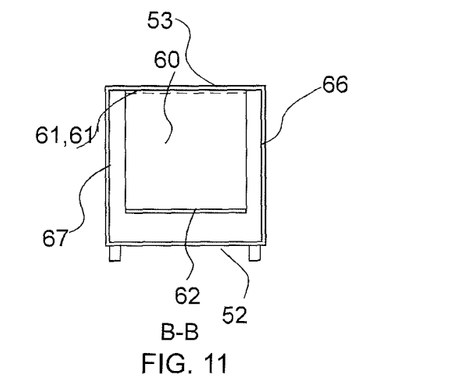
FIG. 11 presents an embodiment of the waste container/separating device according to the invention, cross-sectioned along the line B-B of FIG. 9.

Material w, such as household waste or recyclable material packed into bags or sacks, is fed in from an inlet point 108, via a feeder channel 106 by opening the valve means 104, into the piping 101A, 101B, 101C, 100, where it is conveyed by the aid of suction/a pressure difference and/or transporting air flowing in the piping into the waste container/separating device 50 from the inlet aperture 55. The passage of the waste material in the waste container/separating device is limited by at least one impact-damping element 60, into which typically at least a part of the material W being conducted from the inlet aperture 55 collides and drops from the effect of gravity downwards in the container. At least one impact-damping element 60 is arranged in the container space 68 of the waste container/separating device transversely with respect to the input direction of the material. In the embodiment of the figures the impact-limiting element is arranged in the opposite section of the container space 68 with respect to the inlet aperture 55, in the embodiment of the figure fairly close to the end wall 51. The impact-limiting element 60 prevents or reduces the collision of material W arriving in the container space from the inlet aperture along with the transporting air into the end wall 51. FIG. 8 presents a situation according to one embodiment in which material, such as a waste bag has been able to hit the impact-damping element. The impact-damping element 60 bends and/or flexes and at the same time dampens the force effect exerted by the material colliding with impact-damping element.

When the material collects from the inlet aperture 55 of the waste container/separating device 50 along with the transporting air, at least a part of the material w collides with the impact-damping element 60 and drops downwards in the container space 68. This is what happens in the situation according to FIG. 8 in the starting phase of the container space of the waste container/separating device. After the filling has progressed, the material collides with the material that has collected in the container earlier.

The invention thus relates to a method for filling a waste container/separating device 50 of a pneumatic material conveying system, in which method material is conducted into a material container from a conveying pipe 100 via an inlet aperture 55 and in which method, for bringing about the suction/partial vacuum needed in conveying the material, the suction side of a partial-vacuum source 30 is connected to act in the container space of the waste container/separating device 50 and onwards into the conveying pipe 100. By changing the point at which the suction of the partial-vacuum source acts or the strength of its action in the container space 68 of the waste container/separating device 50, the input direction in the container space of the material W being conducted into the container space from the inlet aperture 55 is acted upon.

According to one embodiment the point at which the suction acts is changed by changing and/or opening and/or closing the medium connections from the suction side of the partial-vacuum generator to the suction aperture 58.

According to one embodiment in the method at least two suction channels are arranged in the container space 68, a first suction channel 57 and a second suction channel 57', in each of which suction channels is at least one suction aperture 58, in which case in the method the medium connection from the suction side of the partial-vacuum generator to the first and/or second suction channel 57, 57' is opened and/or closed with the valve means 36, 36'.

According to one embodiment the container space 68 is filled with material in the manner desired by guiding the material W into the desired parts of the container space by acting upon the suction.

According to one embodiment in the method the point at which the suction acts is changed between suction channels 57, 57' arranged in the top part of the container space.

According to one embodiment the material W is waste material, more particularly household waste or recyclable material packed into bags or sacks.

According to one embodiment the collision of the material W is damped in the container space 68 with at least one impact-damping element 60.

The invention also relates to an apparatus for filling a waste container/separating device 50 of a pneumatic material conveying system, in which material container is an inlet aperture 55, to which the material conveying pipe 100 of the conveying system can be connected for conducting the material from the conveying pipe into the container part of the waste container/separating device, and means for connecting the suction side of a partial-vacuum source 30, for bringing about the suction/partial vacuum needed in conveying the material, to the container space 68 of the waste container/separating device 50 and onwards into the conveying pipe 100. The apparatus comprises means 34, 34', 36, 36', 57, 57', 58 for changing the point at which the suction of the partial-vacuum source 30 acts or for changing the strength of its action in the container space 68 of the waste container/separating device 50 in such a way that the input direction in the container space 68 of the material W being conducted into the container space from the inlet aperture 55 is acted upon.

According to one embodiment the means 34, 34', 36, 36', 57, 57', 58 for changing the point at which the suction of the partial-vacuum source 30 acts or for changing the strength of its action comprise at least two suction channels 57, 57', in which is at least one suction aperture 58, and also valve means 36, 36' for connecting the suction channels to the suction side of the partial-vacuum source.

According to one embodiment at least two suction channels, a first suction channel 57 and a second suction channel 57' are arranged in the container space 68, in each of which suction channels is at least one suction aperture 58, in which case in the method the medium connection from the suction side of the partial-vacuum generator to the first and/or second suction channel 57, 57' is opened and/or closed with the valve means 36, 36'.

According to one embodiment the first suction channel 57 and the second suction channel 57' are arranged in the container space 68 on different sides of the inlet aperture 55 in the horizontal direction.

According to one embodiment the suction channel 57, 57' extends in the container space 68 to at least a part of its length and/or width.

According to one embodiment a number of suction apertures 58 are arranged in the suction channel 57, 57', distributed along the length of it.

According to one embodiment at least one impact-damping element 60 is arranged in the container space 68 of the waste container/separating device 50.

According to one embodiment an impact-damping element 60 is arranged in the container space transversely with respect to the input direction of the material.

According to one embodiment the impact-damping element 60 is arranged at its top part 61 on the upper wall 53 of the waste container/separating device or in the proximity of said upper wall.

According to one embodiment a weight is arranged or formed in the bottom part 62 of the impact-damping element 60.

According to one embodiment the impact-damping element 60 is arranged to be turnable or bendable at its top part 61 around the transverse axis.

According to one embodiment the impact-damping element 60 extends to a part of the height of the container space 68.

According to one embodiment the impact-damping element 60 extends to a part of the width of the container space 68.

According to one embodiment the impact-damping element 60 is arranged in the container space 68 at a distance from the inlet aperture 55, preferably close to the opposite wall of the container in the direction of movement of the material.

The invention also relates to a waste container/separating device 50 for pneumatic pipe transporting systems for material, which device comprises at least one inlet aperture 55 for connecting it to a material conveying pipe 100, and means for connecting the suction side of a partial-vacuum generator to the container. A first suction channel 57 and a second suction channel 57' are arranged in the container space 68 of the waste container/separating device, in each of which suction channels is at least one suction aperture 58, and means for connecting the suction side to the suction channels.

According to one embodiment the first suction channel 57 and the second suction channel 57' are arranged in the container space 68 on different sides of the inlet aperture 55 in the horizontal direction.

According to one embodiment the suction channel 57, 57' extends in the container space 68 to at least a part of its length and/or width.

According to one embodiment a number of suction apertures 58 are arranged in the suction channel 57, 57', distributed along the length of it.

According to one embodiment the waste container/separating device is container of the freight container type.

According to one embodiment at least one impact-damping element 60 is arranged in the container space 68 of the waste container/separating device.

According to one embodiment the impact-damping element 60 is arranged in the container space 68 transversely with respect to the input direction of the material.

According to one embodiment the impact-damping element 60 is arranged at its top part 61 on the upper wall 53 of the waste container/separating device or in the proximity of said upper wall.

According to one embodiment a weight is arranged or formed in the bottom part 62 of the impact-damping element 60.

According to one embodiment the impact-damping element 60 extends to a part of the height of the container space 68.

According to one embodiment the impact-damping element 60 extends to a part of the width of the container space 68.

According to one embodiment the impact-damping element 60 is arranged to be turnable or bendable at its top part 61 around the transverse axis.

According to one embodiment the impact-damping element 60 is arranged to turn or bend away from the front when the waste container/separating device 50 is emptied of material w.

According to one embodiment the impact-damping element 60 is a mat or tarpaulin or corresponding.

According to one embodiment the impact-damping element 60 is a mesh or corresponding.

According to one embodiment the impact-damping element 60 comprises one or more of the following: rubber, plastic, textile, wire mesh or some other flexible material.

Typically the material is waste material, such as waste material arranged in bags. A refuse chute can be configured to be a part of the pneumatic waste conveying system or it can be a separate part, in which waste material is conducted into a waste room, waste container or corresponding.

According to one embodiment the suction channel is a pipe, hose or corresponding.

The waste container/separating device according to the invention is also suitable in connection with those types of pneumatic pipe transport systems for material in which the material is moved by means of a pressure difference. Such types are e.g. systems in which the conveying pipe is blown into, for conveying the material into the waste container/separating device. In this case the transporting air is arranged to be removed from the waste container/separating device e.g. via the connection 56.

It is obvious to the person skilled in the art that the invention is not limited to the embodiments presented above, but that it can be varied within the scope of the claims presented below. The characteristic features possibly presented in the description in conjunction with other characteristic features can if necessary be used separately to each other.

The invention claimed is:

1. A method for filling a waste container/separating device (50) of a pneumatic material conveying system, comprising the following steps:
   supplying waste to the waste container/separating device (50) from a conveying pipe (100) via an inlet aperture (55), said waste container/separating device (50) includes a container space;
   providing a partial-vacuum source including a suction side;
   supplying a suction/partial vacuum needed for conveying the waste, the suction side of the partial-vacuum source (30) being connected to act in the container space of the waste container/separating device (50) and into the conveying pipe (100);
   said connecting enabling an adjustable movable point at which suction of the partial vacuum source acts in the container space;
   changing at least one of a point at which the suction of the partial-vacuum source acts or a strength of the suction/partial vacuum in the container space (68) of the waste container/separating device (50); and
   changing the input direction of the waste into the container space of the waste (W) being supplied into the container space from the inlet aperture (55) changing at least one of the point at which the suction of the partial-vacuum source acts or the strength of the suction/partial vacuum.

2. The method according to claim 1, wherein the point at which the suction acts is changed by changing and/or opening and/or closing the medium connections from the suction side of the partial-vacuum generator to the suction aperture (58).

3. The method according to claim 1, wherein in the method at least two suction channels are arranged in the container space (68), a first suction channel (57) and a second suction channel (57'), in each of which suction channels is at least one suction aperture (58), in which case in the method the medium connection from the suction side of the partial-vacuum generator to the first and/or second suction channel (57, 57') is opened and/or closed with the valve means (36, 36').

4. The method according to claim 1, wherein the container space (68) is filled with waste in the manner desired by guiding the waste (W) into the desired parts of the container space by acting upon the suction.

5. The method according to claim 1, wherein in the method the point at which the suction acts is changed between suction channels (57, 57') arranged in the top part of the container space.

6. The method according to claim 1 wherein, the waste (W) is household waste or recyclable waste packed into bags or sacks.

* * * * *